(12) United States Patent
Garib et al.

(10) Patent No.: US 12,265,538 B2
(45) Date of Patent: Apr. 1, 2025

(54) SCHEMA-ADAPTABLE DATA ENRICHMENT AND RETRIEVAL

(71) Applicant: Capital One Services, LLC, McLean, VA (US)

(72) Inventors: Lauren A. Garib, McLean, VA (US); Stephen Winn, McLean, VA (US); Philip Henault, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 460 days.

(21) Appl. No.: 17/517,718

(22) Filed: Nov. 3, 2021

(65) Prior Publication Data
US 2023/0139783 A1    May 4, 2023

(51) Int. Cl.
*G06F 16/2455* (2019.01)
*G06F 16/23* (2019.01)
*G06N 3/045* (2023.01)
*G06N 3/08* (2023.01)

(52) U.S. Cl.
CPC ...... *G06F 16/2455* (2019.01); *G06F 16/2379* (2019.01); *G06N 3/045* (2023.01); *G06N 3/08* (2013.01)

(58) Field of Classification Search
CPC ... G06F 16/2379; G06F 16/2455; G06N 3/08; G06N 3/045
USPC .......................................................... 707/769
See application file for complete search history.

(56) References Cited

U.S. PATENT DOCUMENTS

| 6,076,090 | A  | * | 6/2000  | Burroughs   | G06F 16/289    |
|           |    |   |         |             | 707/999.102    |
| 7,526,481 | B1 | * | 4/2009  | Cusson      | G06F 16/9574   |
| 8,214,362 | B1 | * | 7/2012  | Djabarov    | G06F 40/174    |
|           |    |   |         |             | 715/224        |
| 9,305,085 | B2 | * | 4/2016  | Biyani      | G06F 16/334    |
| 10,002,179 | B2 | * | 6/2018  | Rais-Ghasem | G06F 16/285   |
| 11,675,503 | B1 | * | 6/2023  | Ekins       | G06F 3/0637    |
|           |    |   |         |             | 711/163        |
| 2005/0256889 | A1 | * | 11/2005 | McConnell | G06F 16/90     |
| 2006/0277224 | A1 | * | 12/2006 | Aftab     | G06F 16/275    |
| 2008/0065612 | A1 | * | 3/2008  | De Bellis | G06F 16/2428   |
| 2011/0258049 | A1 | * | 10/2011 | Ramer     | G06Q 30/0273   |
|           |    |   |         |             | 705/14.69      |
| 2013/0091138 | A1 | * | 4/2013  | Liensberger | G06F 40/169  |
|           |    |   |         |             | 707/E17.127    |

(Continued)

*Primary Examiner* — Sherief Badawi
*Assistant Examiner* — Jessica N Le
(74) *Attorney, Agent, or Firm* — Foley & Lardner LLP

(57) ABSTRACT

A method includes obtaining a schema of a database and obtaining a field of a data table of the schema, the field including a field name and a field descriptor. The method includes accessing a first set of records structured in accordance with the schema and assigning a category to the field of the schema based on the field name and the field descriptor using a machine learning model. The method includes receiving an identifier via an application program interface and obtaining a set of query generation model parameters associated with the database or the schema. The method includes generating a plurality of queries based on the set of query generation model parameters, the identifier, and the category. The method includes retrieving a second set of records from the database based on the plurality of queries and storing the second set of records in association with the identifier.

20 Claims, 3 Drawing Sheets

(56) References Cited

U.S. PATENT DOCUMENTS

| | | | | |
|---|---|---|---|---|
| 2013/0304712 A1* | 11/2013 | Meijer | .................... | H04N 21/80 |
| | | | | 707/694 |
| 2016/0210470 A1* | 7/2016 | Rozenberg | .......... | G06F 21/6227 |
| 2019/0303449 A1* | 10/2019 | Canis | ................ | G06F 16/24556 |
| 2020/0151154 A1* | 5/2020 | Kumar | .................. | G06F 16/248 |
| 2020/0311112 A1* | 10/2020 | Meng | .................. | G06F 16/3346 |
| 2020/0401930 A1* | 12/2020 | Smirnov | ................ | G06N 20/00 |
| 2021/0150263 A1* | 5/2021 | Corwin | ................ | G06F 16/148 |
| 2021/0342352 A1* | 11/2021 | Stuart | ................ | G06F 16/9024 |
| 2021/0383070 A1* | 12/2021 | Hunter | .................... | G06F 40/30 |
| 2022/0075825 A1* | 3/2022 | Helms | .................... | H04L 9/3234 |
| 2023/0031049 A1* | 2/2023 | Bishop, III | .......... | G06F 9/4881 |
| 2023/0073312 A1* | 3/2023 | Portisch | ................ | G06F 16/258 |
| 2023/0316197 A1* | 10/2023 | Jemiri | .................... | G06N 20/20 |
| | | | | 705/7.36 |

* cited by examiner

SCHEMA-ADAPTABLE DATA ENRICHMENT AND RETRIEVAL

BACKGROUND

Data from disparate applications have become increasingly useful in a wide variety of cross-application environments. Such data may be useful in areas such as software development, machine learning model refinement, or anomaly detection. This utility has motivated the storage of an ever-growing influx of data. The variety and volume of data being collected may cause data to be stored in a fragmented manner. This fragmented manner is reflected in the diversity of schemas used to organize data and the types of databases used to store data. Such fragmentation may increase the difficulty of retrieving data for cross-application use.

SUMMARY

Data distributed across different data schemas or different databases may be difficult to collect for ad-hoc analysis or application development. Even when the databases storing data targeted by a user are known to the user, the computational cost of executing scripts that traverse the data tables of the database to search for the target data may be significant. Such costs may cause database administrators to require such operations be performed as scheduled batch jobs, limiting the usefulness of this data for various real-world applications. Some embodiments described in this disclosure may provide a pipeline that intelligently enriches data table fields of a database and generate queries based on the enriched data. As described further below, such operations may more efficiently retrieve data from a set of databases of an enterprise-scale system.

To address problems such as those discussed above, some embodiments may provide a method of optimizing and then accessing different data tables spread across a set of databases attributes. Optimizing the data tables may include obtaining the schemas of the data tables to determine how the fields of the data tables are structured. By indexing, tagging or otherwise categorizing the fields of the schema, some embodiments may quickly determine which fields and databases to access. Furthermore, some embodiments may increase category consistency and accuracy by using a set of machine learning models to categorize the fields based on the field names, field descriptors, or attributes of the fields.

After optimizing the data tables with categories, some embodiments may receive a web request or another message with an identifier from a user. The identifier or other data stored in the message may be used to efficiently determine which databases and data tables to access based on the categories assigned to the data table. Some embodiments may reduce the number of databases or data tables to be searched by using the categories. Once these databases are determined, an application or service may obtain a set of query templates or another set of query generation model parameters for generating queries interpretable by these databases. Some embodiments may then use the set of query generation model parameters to generate a set of queries that, upon execution, causes a search through categorized fields for records related to the identifier. Furthermore, some embodiments may store records in association with the identifier in an in-memory data store to efficiently retrieve the records after receiving a subsequent message that includes the identifier.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
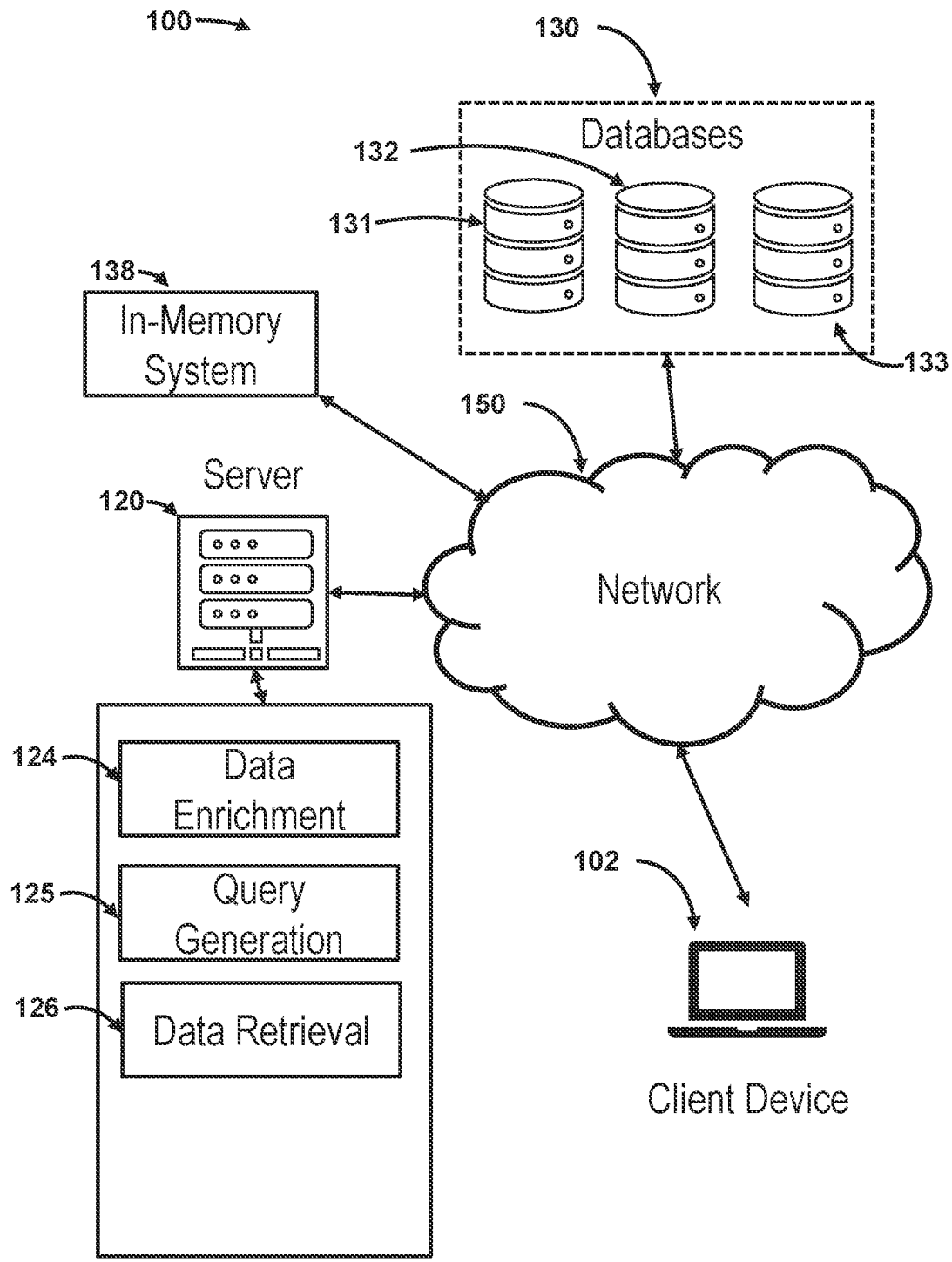
FIG. 1 shows an illustrative system for retrieving data from a plurality of schema, in accordance with one or more embodiments.

FIG. 1 shows an illustrative system for retrieving data from a plurality of schema, in accordance with one or more embodiments. The system 100 includes a client computer device 102. While shown a laptop computer, it should be noted that the client computer device 102 may include other types of computer devices such as a laptop computer, a desktop computer, a wearable headset, a smartwatch, another type of mobile computing device, etc. In some embodiments, the client computer device 102 may communicate with various other computer devices via a network 150, where the network 150 may include the Internet, a local area network, a peer-to-peer network, etc.

The client computer device 102 may send and receive messages through the network 150 to communicate with a server 120, where the server 120 may include non-transitory storage medium storing program instructions to perform one or more operations of subsystems 124-126. It should further be noted that, while one or more operations are described herein as being performed by particular components of the system 100, those operations may be performed by other components of the system 100 in some embodiments. For example, one or more operations described in this disclosure as being performed by the server 120 may instead be performed by the client computer device 102. Furthermore, although some embodiments are described herein with respect to machine learning models, other prediction models (e.g., a statistical model) may be used instead of or in addition to the machine learning models. For example, a statistical model may be used to replace a neural network model in one or more embodiments to determine a score.

In some embodiments, the various computers and subsystems illustrated in FIG. 1 may include one or more computer devices having or otherwise capable of accessing electronic storage, such as the set of databases 130. The set of databases may include a first database 131, a second database 132, and a third database 133, or other electronic storage devices. The set of databases 130 may include relational databases, such as a MySQL database or PostgreSQL™ database. Alternatively, or in addition, the set of databases 130 may include a non-relational database, such as MongoDB™ database, Redis database, Neo4j™ database, Cassandra™ database, Amazon Neptune™ database, etc. Furthermore, some embodiments may communicate with an API of a third-party data service via the network 150 to obtain records or other data not stored in the set of databases 130 based on a query parameter sent to the API. In addition, the client computer device 102 or the server 120 may access data stored in an in-memory system 138, where the in-memory system may include an in-memory data store that stores data in a key-value data store such as Redis™. As described elsewhere in this disclosure, some embodiments may store queries or query results associated with the queries in an in-memory data store to accelerate data retrieval operations.

As used in this disclosure, a record may include a basic data structure, where each attribute of the record may be associated with the record and be used to obtain other attributes of the record. In some embodiments, a field of a record may represent a type of information of the record. For example, a record may include a first attribute "firstname lastname" for a first field "user name" and a second attribute "x03k620482" for a second field "user identifier." In some embodiments, a record may be stored in a data table, where each data table may include multiple records that share the same set of fields. In some embodiments, a schema of a data table may indicate one or more structures of a set of data tables, where the schema may define a database structure or constraints on the attributes of a data table. For example, a schema may define the fields of the records of a data table or the limits or allowed values for attributes of the records based on their fields.

In some embodiments, the system 100 may label, categorize, or otherwise enrich data associated with records of data tables, such as by assigning a category to fields of the record and storing identifiers of the assigned fields in an index of fields corresponding with the category. As described elsewhere in this disclosure, a category assigned to a field may indicate that attribute values of the field are of a specified primitive data type. For example, a category may indicate a value type representing a Boolean or an 8-bit integer. Alternatively, or in addition, a category assigned to a field may indicate that attributes of the field are business-logic-specific. For example, a category may indicate that attributes of a field are user identifiers, organizations, sites, business logic categories or other domain-specific categories, etc.

In some embodiments, the client computer device 102 may send a query parameter via a message, such as a web request conforming to an established communication protocol (e.g., Hyper Text Transfer Protocol (HTTP), HTTP Secure (HTTPS), etc.). The query parameter may be associated with an assigned category that is associated with a set of identifiers of one or more fields of a subset of the set of databases 130. Some embodiments may search and select a corresponding set of query templates or other query generation model parameters to generate a set of queries for the subset of databases. For example, some embodiments may receive a first user identifier and generate a plurality of structured queries corresponding with different data tables having different schemas distributed across a plurality of data tables. As used in this disclosure, a structured query may include a database query, where a database query is interpretable by an API of the database for data retrieval. As used in this disclosure, a data table may be structured in accordance with a schema of the data table if the data table includes the fields of the schema and implements the relationships or limitations defined by the schema. Some embodiments may then use the set of queries to retrieve records, record values, or other data from the set of databases 130.

Subsystems 124-126

In some embodiments, the data enrichment subsystem 124 may access a database of the set of databases 130 to obtain a set of records or other data from the set of databases 130. The data enrichment subsystem 124 may determine whether a new data source such as a new database or new data table has been added to the set of databases 130. In response to a determination that the data source has been added, the data enrichment subsystem 124 may enrich a field of the data source. Alternatively, or in addition, some embodiments may receive a direct identifier of a database or data table that causes the data enrichment subsystem 124 to enrich a field of the database or data table. Some embodiments may determine one or more schema of a set of data tables of the database, where the field of the schema may then be enriched by assigning categories or other values to the field.

In some embodiments, the data enrichment subsystem 124 may enrich a set of fields of a data table or schema of the data table by tagging the set of fields with a set of values used to increase the speed of data retrieval from the data table or schema. Alternatively, or in addition, the data enrichment subsystem 124 may generate a record or other collection of values that associate the field identifiers with a category assigned to the field. In some embodiments, the data enrichment subsystem 124 may use the attributes of the fields of a data table to determine a category to assign to a field, where a category may be represented by a Boolean value, a value selected from a pre-determined set of values (e.g., an enumerated type), or a quantitative value. For example, some embodiments may determine that all the attributes of a field satisfy a particular string pattern and, in response, assign the field with a category associated with the string pattern. As another example, based on a determination that each of five attributes of a field satisfies a field pattern that includes a first sequence of letters and a second sequence of numbers, some embodiments may set a Boolean value to "true" for a category associated with the field.

In some embodiments, the data enrichment subsystem 124 may use a machine learning model to determine a category for a field or determine a string pattern associated with attributes of the field. For example, some embodiments may provide a field descriptor and field name of a field to a neural network model described in this disclosure to determine a category for the field. By using a machine learning model, some embodiments may account for differences in field description or nomenclature that may escape conventional rule-based categorization operations for the fields of a data table. Some embodiments may reference an ontology graph to increase categorization accuracy, where the ontology graph may be associated with the data table, associated schema of the data table, or database storing the data table. Furthermore, some embodiments may select an ontology graph from a plurality of ontology graphs based on the data table, associated schema, or database.

In some embodiments, the query generation subsystem 125 may obtain one or more query parameters, where a query parameter may be used as a filter of a query. For example, some embodiments may receive a user identifier via an HTTP web request and provide the user identifier to the query generation subsystem 125. The query generation subsystem 125 may obtain a set of query templates associated with a set of data tables or schema. The query generation subsystem 125 may then generate a plurality of queries based on the query parameter and the set of query parameters. In addition, the query generation subsystem 125 may obtain other values associated with the query parameter and use the other values as additional query parameters. For example, after being provided with a first user identifier, the query generation subsystem 125 may use a directed graph of user identifiers to determine other user identifiers associated with the first user identifier via graph edges of the directed graph.

In some embodiments, the query generation subsystem 125 may use the query template or query generation model parameters to generate queries compatible with different database systems. For example, the first database 131 may be accessible via a Snowflake™ REST API, the second database 132 may be accessible via a PostgreSQL™ API database, and the third database 133 may include a NoSQL database that is accessible via a MongoDB Atlas™ API. One or more of the databases may be stored or managed on an on-site server system, on a cloud-based system, a hybrid data system, or the like. For example, the first database 131 may be hosted on a cloud-based Snowflake™ server and the second database 132 may be hosted on an on-site Red Hat™ server. Some embodiments may use a first query template to generate a first subset of queries of the plurality of queries, where the first subset of queries may be compatible with the Snowflake™ database. Similarly, some embodiments may use a second and third query template to generate second and third subsets of queries, respectively, where the second subset of queries is interpretable by the second database 132, and where the third subset of queries is interpretable by the third database 133.

In some embodiments, the data retrieval subsystem 126 may use the queries generated by the query generation subsystem 125 to retrieve data from the set of databases 130. Some embodiments may use multi-threading to concurrently search through records of a database and retrieve one or more values of the database based on a query. For example, after generating a query for a user identifier, some embodiments may execute ten different threads to perform ten parallelized searches through a database.

In some embodiments, the data retrieval subsystem 126 may determine that one or more queries are duplicative with respect to a previously generated query. Some embodiments may first cache a set of records, record values, or other retrieved query results in association with a first query, where the first query was used to retrieve the query results from an in-memory data store. Some embodiments may then receive another web message that causes the creation of another query that matches the first query and, in response, retrieve the query results from the in-memory data store. For example, some embodiments may determine that a query searching for a user identifier was already performed based on a history of previously sent queries stored in a database. In response, the data retrieval subsystem 126 may retrieve a set of records, record values, or other query results stored in association with the previously-sent query from an in-memory data store without retrieving the record from the set of values.

In some embodiments, the data retrieval subsystem 126 may determine that one or more of the set of structured queries may be de-duplicated. For example, using one or more operations described in this disclosure, some embodiments may generate a first plurality of structured queries based on a first message, where two of the generated queries may be identical to each other or share a set of query parameters. Some embodiments may de-duplicate the plurality of queries by deleting or otherwise removing from consideration one of the pair of duplicated queries before using the plurality of queries to retrieve data from the set of databases 130.

Figure 2:
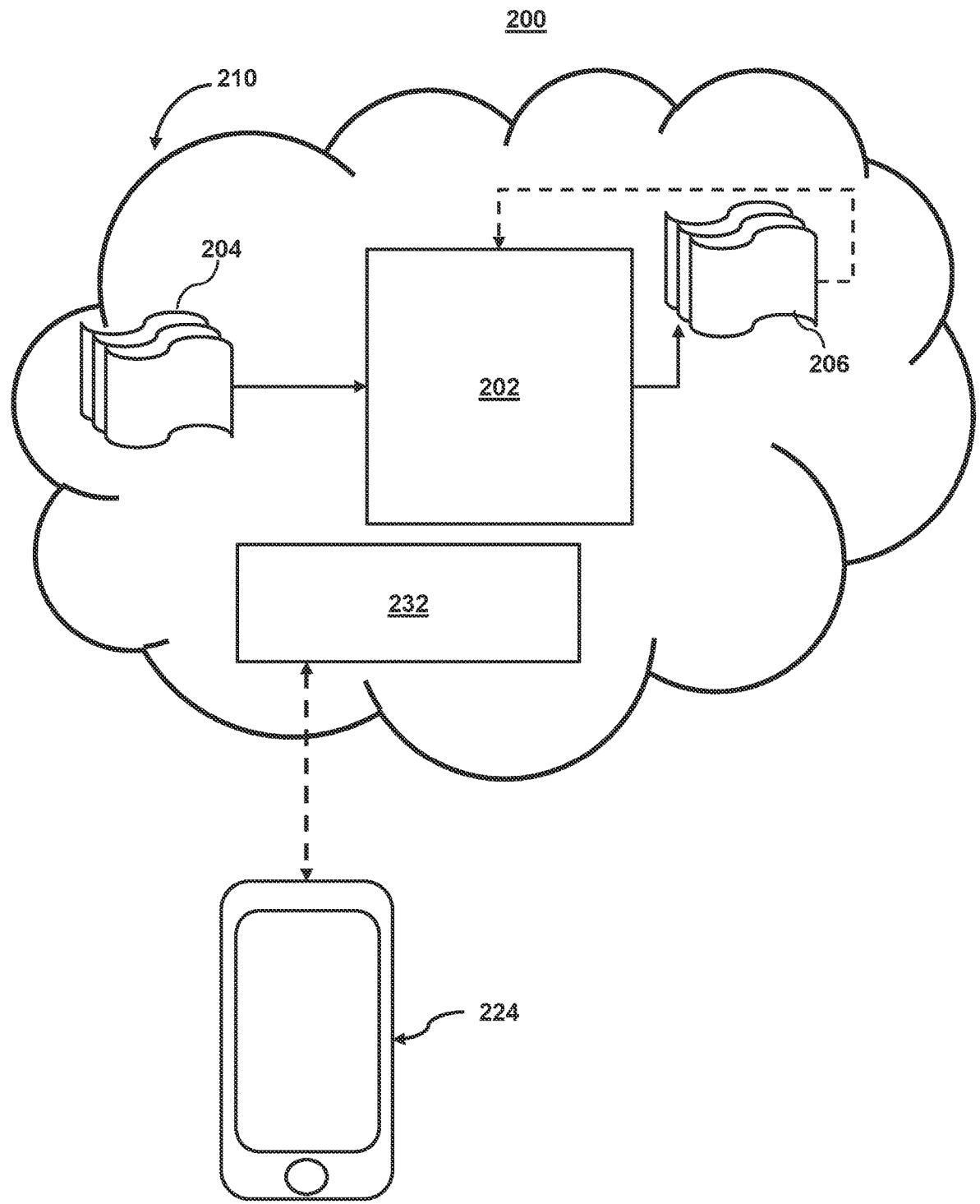
FIG. 2 shows an illustrative diagram of a system for enriching fields used to retrieve data from a set of databases, in accordance with one or more embodiments.

FIG. 2 shows an illustrative diagram of a system for enriching fields used to retrieve data from a set of databases, in accordance with one or more embodiments. A system 200 may include computer device 224, where the computer device 224 may be any computer device, including, but not limited to, a smartphone, a laptop computer, etc. FIG. 2 also includes cloud system 210 implemented on a distributed computing system, where the cloud system 210 may include any computing device described in this disclosure or any other type of mobile computer device, fixed computer device, or other computer device. In some embodiments, the distributed computing system may include a set of servers or remote computing devices operated by a third-party, where the cloud system 210 may include a set of programs or computing services being executed by the distributed computing system. In some embodiments, the cloud system 210 may perform processor operations or data storage operations similar or the same as those described elsewhere in this disclosure. For example, a set of operations performed by the client computer device 102, the server 120, the network 150, or the set of databases 130 may be performed by the cloud system 210.

In some embodiments, the cloud system 210 may include a database configured to store data for faster data retrieval. For example, the cloud system 210 may include an in-memory data system, such as one running on Amazon Elasticache™ or the like. In some embodiments, the cloud system 210 may include a machine learning model 202. The machine learning model 202 may take inputs 204 and provide outputs 206. The inputs may include multiple datasets, such as a training dataset and a test dataset. Each dataset of the plurality of datasets (e.g., inputs 204) may include data subsets related to field data, categories to assign to a field, Boolean values, etc. In some embodiments, outputs 206 may be fed back to the machine learning model 202 as input to train the machine learning model 202 (e.g., alone or in conjunction with user indications of the accuracy of outputs 206, labels associated with the inputs, or with other reference feedback information). For example, the system may receive a field including a field name, a field descriptor, and a set of field attributes stored in a training set of records, where the field input is labeled with a known category for the field. The system may then train the machine learning model 202 to classify the field with the known category.

In some embodiments, machine learning model 202 may include an artificial neural network. In such embodiments, machine learning model 202 may include an input layer and one or more hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiment, machine learning model 202 may update its configurations (e.g., weights, biases, or other parameters) based on the assessment of its prediction (e.g., outputs 206) and reference feedback information (e.g., user indication of accuracy, reference categories, or other information). In some embodiment, where machine learning model 202 is a neural network, connection weights may be adjusted to reconcile differences between the neural network's prediction and reference feedback. For example, an output layer of the machine learning model 202 may correspond to a category and a field identifier or field descriptor known to correspond to that classification may be provided to an input layer of the machine learning model 202 during training.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. For example, one or more neurons (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition for machine learning model 202 may be more free-flowing, with connections interacting in a more chaotic and complex fashion. During testing, an output layer of the machine learning model 202 may indicate whether or not a given input corresponds to a classification of the machine learning model 202 (e.g., "user ID," "account name," another a domain-specific category).

In some embodiments, the cloud system 210 may implement non-learning methods to categorize a field, such as implementing a rules engine. As used in this disclosure, a rules engine may apply a set of rules representing conditional statements conditional statements in a sequential order sorted by priority values, where a higher priority rule is applied before a lower priority rule is applied. Determining a category for field using the rules engine may include determining whether a condition of a higher priority rule is satisfied and assigning a category to the field in response to a determination that the condition of the higher priority rule is satisfied. In response to a determination that the condition of the higher priority rule is not satisfied, some embodiments may proceed to a lower priority rule to determine whether a condition(s) of the lower priority rule is satisfied. Some embodiments may then proceed down the priority sequence of a rules engine until a terminal condition of the rules engine is satisfied. A rules engine may be implemented as a software component, a stand-alone program, a function, a service, etc.

In some embodiments, the cloud system 210 may implement multiple machine learning models to assign a category, a set of non-learning models to assign a category, a decision model that includes both machine learning models and non-learning models to assign the category, etc. For example, the cloud system may use the results of one neural network as a training set for a second machine learning model. Alternatively, the cloud system may use the results of a machine learning model to modify the parameters of a non-learning decision model, such as the rules of a rule engine or parameters of rules of a rules engine. For example, some embodiments may determine that a category is assigned to a set of fields based on the results of a first neural network, where a rules engine does not assign the category to the set of fields. In response, some embodiments may determine whether an assignment score associated with the assignment of a category by the neural network satisfies a threshold. For example, the assignment score for a category may include a count of the times that the neural network predicts the category for the field that a rule engine did not predict for the field, where satisfying the threshold may include determining that the count of times is greater than the threshold. Alternatively, or in addition, the assignment score may include a confidence value for a predicted category, where satisfying the threshold may include determining that the confidence value is greater than a confidence threshold.

In response to a determination that the threshold is satisfied by the assignment score, some embodiments may modify a parameter of a rules engine, another non-learning model, or another machine learning model. For example, after determining that the threshold is satisfied by the assignment score for a category, some embodiments may search the field names of the fields assigned to the category for a set of words or phrases shared by the field names which was not considered by the rules engine. Some embodiments may then add a new rule to the rules engine that causes the rules engine to assign a category to a field if a field name of the field includes the set of words or phrases. Furthermore, some embodiments may modify the priority associated with the new rule to have a higher than the priority of a previous rule that was used to assign an incorrectly-assigned category to a field.

Alternatively, or in addition, some embodiments may use a hierarchical machine learning model, where a plurality of machine learning models may be used concurrently or sequentially. Some embodiments may initially determine a category for a field using a first, lesser computing-cost neural network and use a second, greater computing-cost neural network if the score based on the result of the first neural does not satisfy a threshold. For example, some embodiments may use a lesser computing-cost feed forward neural network (FFNN) to determine a category to assign to a field based on a set of field names or descriptors of the field. In response to a determination that the confidence value of the FFNN result is less than a confidence threshold, some embodiments may use a second, greater computing-cost neural network to select a category for assignment, such as a multi-headed self-attention transformer. In some embodiments, the second neural network may be used to train the learning model parameters of the first. For example, after a determination that the second neural network predicted a category for a descriptor that was not predicted by the first neural network, some embodiments may use the category and descriptor to re-train the first neural network.

In some embodiments, the system 200 may include an API. In some embodiments, the API layer 232 or a portion of the API layer 232 may be implemented on the computer device 224. Alternatively, or additionally, API layer 232 may reside on one or more components of the cloud system 210.

In some embodiments, the API layer 232 may provide an interface to data or access to one or more application in a language-agnostic manner. In some embodiments, the API layer 232 may use various architectural arrangements. For example, system 200 may be partially based on API layer 232, such that there is strong adoption of simple object access protocol (SOAP) web services or representational state transfer (REST)ful web-services. Alternatively, system 200 may be fully based on the API layer 232, such that separation of concerns between layers like API layer 232, services, and applications are in place.

In some embodiments, the system architecture of the system 200 may use a microservice approach. For example, some embodiments may include a Front-End Layer and a Back-End Layer where microservices reside. In this kind of architecture, the role of the API layer 232 may provide integration between Front-End and Back-End. In such cases, API layer 232 may use RESTful APIs (exposition to front-end or even communication between microservices). In some embodiments, the API layer 232 may use AMQP (e.g., Kafka, RabbitMQ, etc.). Alternatively, or in addition, the API layer 232 may use incipient usage of communications protocols such as gRPC, Thrift, etc. Furthermore, the system architecture of the system 200 may use an open API approach in some embodiments. For example, the API layer 232 may use commercial or open source API Platforms and their modules or include a developer portal, where the API layer 232 may use RESTful APIs as standard for external integration.

Figure 3:
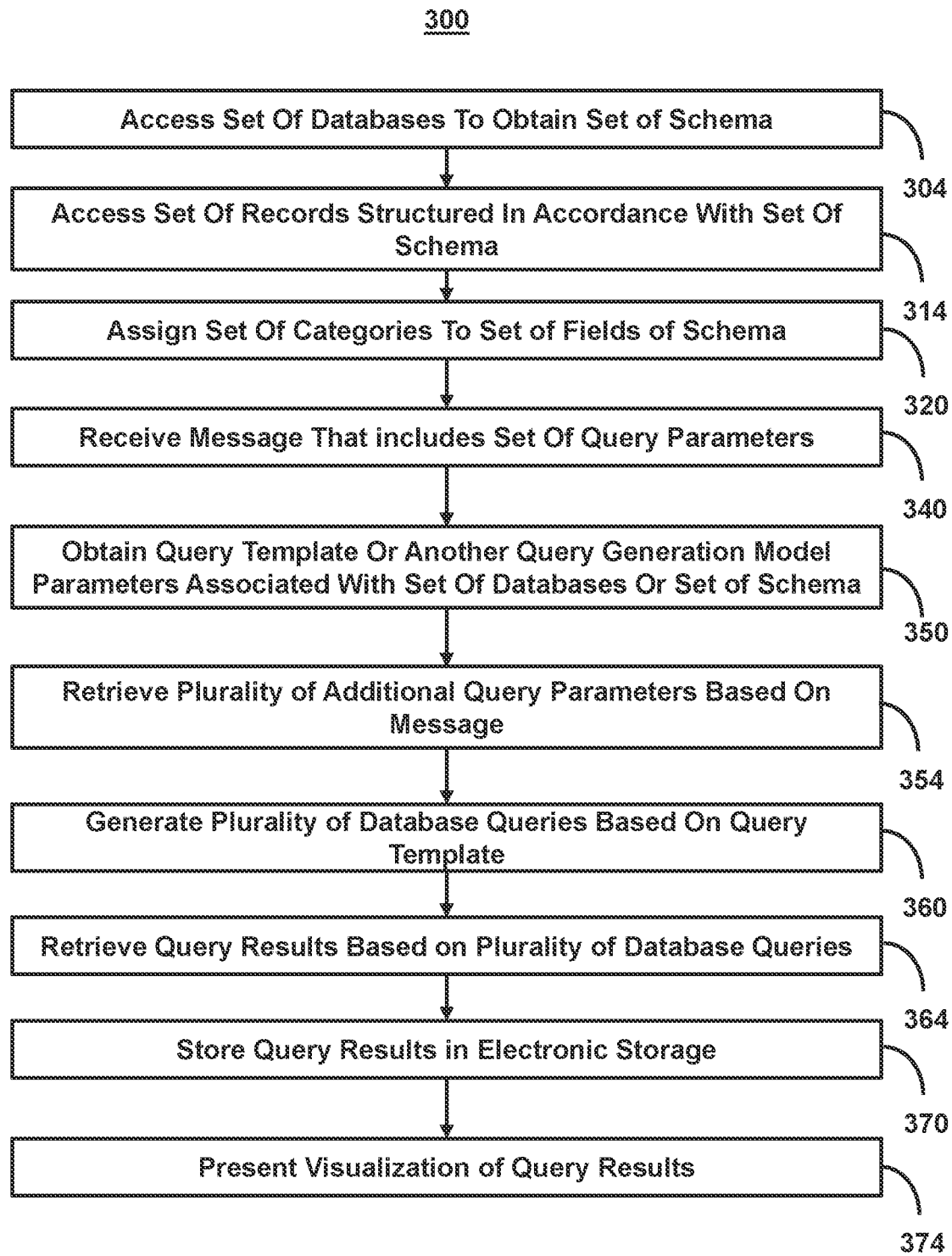
FIG. 3 shows a flowchart of a process to optimize a set of databases for an efficient search, in accordance with one or more embodiments.

FIG. 3 shows a flowchart of a process to optimize a set of databases for an efficient search, in accordance with one or more embodiments. Operations of the process 300 may begin at block 304. Some embodiments may access a set of databases to obtain a set of schema, as indicated by block 304. Some embodiments may access a database via a set of APIs of the database, where the set of APIs may include SQL APIs, such as Red Hat™ database APIs, Snowflake™ database APIs, Cassandra DB database APIs, or the like. Some embodiments may obtain the schema from a data table that includes an index of table identifiers or their corresponding fields (i.e., "column"), where the data table may be structured in accordance with the schema. Alternatively, some embodiments may obtain a schema from a database that includes an index of schemas used to store data in the database. Some embodiments may obtain access to a database by creating a connection to an API of the database and sending database calls via the connection. For example, some embodiments may generate a connection object with a database API or address as a property of the connection object and execute a method of the connection object to open the connection to the database.

Various operations may be performed to obtain the schema of the database. In some embodiments, a schema for a database may be known by storing or importing schema information for a data table from a database. Various operations may trigger the import and storage of the schema information, such as data table creation, data table import, data table update, or the like. For example, some embodiments may access a MySQL database to obtain the schemas for all of the data tables of a database from the "INFORMATION_SCHEMA.TABLES" data table. Alternatively, or in addition, some embodiments may access a pre-set data store different from the database to obtain a database schema. For example, some embodiments may access a first data table stored on a first server to retrieve the schema of a second data table stored on a second server.

Some embodiments may obtain a set of fields of a data table of the schema, as indicated by block 304. In some embodiments, a database may include a set of data tables, where each data table has a unique schema. Alternatively, some embodiments may access a database having multiple data tables, where at least two of the data tables may have the same schema. Some embodiments may use an API of the database to retrieve fields of the data tables, where the field may include a field name or a field descriptor. For example, some embodiments may use the SQL command "Select"Select <TABLENAME>, object ObjectID FROM sys.tables" to retrieve the name of a field and a numeric or string identifier of the field name. Similarly, some embodiments may obtain a field descriptor, where the field descriptor may include values interpretable as strings, categories, Boolean values, or the like. For example, some embodiments may obtain a field descriptor of a field that includes natural language text. As described elsewhere in this disclosure, some embodiments may use a machine learning model to determine one or more categories based on the field descriptor.

Some embodiments may perform one or more of the operations described above for a plurality of databases. For example, some embodiments may obtain a first schema and a second schema from a first database and obtain a third schema and a fourth schema from a second database. Some embodiments may perform operations to access a database or other data sources upon a detection of the database or data source. For example, some embodiments may execute a script that crawls through a set of data sources to determine if each of the data sources have already been analyzed to obtain any new schemas.

Some embodiments may access a set of records structured in accordance with the obtained set of schema, as indicated by block 314. Some embodiments may access a specified set of records based on their time of entry or time of update. For example, some embodiments may access a record based on a determination that the record was one of the previous N records updated in a data table, where the value of "N" may be 1, greater than 1, may be greater than 5, greater than 10, or some other number. Alternatively, or in addition, some embodiments may randomly or pseudo-randomly sample a number of records of a data table to obtain the set of records. For example, some embodiments may use a pseudorandom algorithm to select a set of N records from the records of a data table, where N records may be one record, to records or some other number of records.

Some embodiments may assign a set of categories for the set of fields based on field name or the field descriptor using a machine learning model, as indicated by block 320. As described elsewhere in this disclosure, some embodiments may use a set of rules, statistical models, or machine learning models to determine scores usable for categorizing a field. Some embodiments may determine a score based on a field name of a field, a field descriptor of the field, a set of attributes of the field, etc. Some embodiments may then assign a category to a set of fields of a schema by determining whether the score satisfies a threshold, where the threshold may include a numeric value, a range of values, a boundary of a feature space region, etc. For example, the threshold may include a range mapping to the category, where satisfying the threshold may include having a score that falls within the range. In response to a determination that the score is within the range mapping to the category, some embodiments may assign the category to a field used to determine the score. Furthermore, some embodiments may assign a plurality of categories to the same field based on a determination that one or more thresholds are satisfied. For example, some embodiments may determine a score comprising a vector and that the vector is within a first feature space region associated with a first category and a second feature space region associated with a second category. In response, some embodiments may assign both the first and second categories to the field.

Some embodiments may determine a category for a field based on a field name of the field. For example, some embodiments may determine that a field name of a field includes the string "OWNR" and assign the field with the category "owner" based on a rules engine that includes a conditional statement that assigns the category "owner" to any field having a field name "OWNR." Alternatively, or in addition, some embodiments may assign the field with the category "owner" based on a determination that "OWNR" is a key that maps to the value "owner" in a dictionary. Some embodiments may segment a string before or while assigning a category. For example, some embodiments may obtain the field name "ACCT_OWNER" and segment the field name into the first string "ACCT" and the second string "OWNER" by using "_" as a delimiter. As shown elsewhere in this disclosure, various other symbols, characters, or combination of symbols characters may also be used as delimiters. Some embodiments may perform similar operations when determining categories based on field descriptors. For example, a field descriptor may include the text "this column includes lists of all record owners." In response to a detection of the word "owners" in the field descriptor, some embodiments may categorize the field with the category "owner" by setting a "owner" property associated with the column to "1" or "true."

Some embodiments may use natural language processing (NLP) methods to categorize or determine other values for a field based on the field name or field descriptor. For example, some embodiments may stem or lemmatize a field descriptor. Some embodiments may perform other operations such as using term frequency-inverse document ("TF-IDF") operations to assign weighted word frequency scores to documents. For example, some embodiments may obtain a corpus that includes field descriptors of a plurality of data tables and generate scores for words of the field descriptors, where each score may be increased based on the number of times the word appears in the field descriptor and decreased based on the number of times the word appears in the corpus.

Some embodiments may use natural language processing (NLP) methods to categorize or determine other values for a field based on the field name or field descriptor. For example, some embodiments may stem or lemmatize a field descriptor. Some embodiments may perform other operations, such as using term frequency-inverse document ("TF-IDF") operations to assign weighted word frequency scores to documents. For example, some embodiments may obtain a corpus that includes field descriptors of a plurality of data tables and generate scores for words of the field descriptors. Each score may be increased based on the number of times the word appears in the field descriptor or decreased based on the number of times the word appears in the corpus.

Some embodiments may use a hierarchical approach to classify a field, where lesser-computing-cost classification operations may be performed first before performing greater-computing-cost classification operations. For example, some embodiments may determine a confidence score for a first classification, where the first classification is determined based on a field name of a field and attribute values of the field using one or more operations described in this disclosure. In response to a determination that the confidence score for the first classifier is less than a score threshold or otherwise does not satisfy the score threshold, some embodiments may then determine use a greater-computation-cost operation such as using a transformer neural network model to assign a category to a field.

In some embodiments, using a machine learning model may include using a set of neural network models to categorize a field based on the field name or field descriptor or otherwise obtain a value based on the neural network. For example, some embodiments may use a recurrent neural network such as a long-short-term-memory (LSTM) neural network to determine a category for a field based on the field descriptor. Using a recurrent neural network may provide a means of accounting for the order of a sequence of words in a field descriptor or other text associated with a field when considering a category for the field. Some embodiments may use a recurrent neural network to generate a score or plurality of scores for a field based on its corresponding field descriptor, where the score may then be used to determine a category or other value for the field. For example, in some embodiments, the score may include a number that is within a numeric range or include a vector that is within a feature space region, where the numeric range or feature space region maps to a category.

Alternatively, or in addition, some embodiments may use a transformer model or another encoder-decoder model to determine a category for the field based on a field name, field descriptor, field attributes, or other values associated with a field. For example, some embodiments may use an attention-based transformer to determine a category for the field by determining an attention vector for each word of a sequence of sub-words. Some embodiments may use a portion of a neural network encoder-decoder model to generate an initial set of embedding vectors for a field name, field descriptor, attributes of the field, or the like. In some embodiments, the neural network encoder-decoder model may include determining a set of weighting values ("attention value") that represent the attention that should be paid to an n-gram such as a specific word, sub-word, or other types of n-gram. Various types of operations may be used to determine a set of attention values. For example, some embodiments may determine an attention value for an n-gram of a sequence of n-grams by using a trained FFNN. Some embodiments may provide the trained FFNN with a first n-gram and another n-gram of the sequence of other n-grams to determine a first n-gram-specific output. Some embodiments may then normalize the first n-gram-specific output using the sum of other neural network outputs, where each respective output of the sum of neural network outputs is determined by providing the FFNN model with the first n-gram and a different respective n-gram of the sequence of n-grams of a field descriptor. Alternatively, some embodiments may determine a set of attention vectors by normalizing a matrix multiplication result using a multi-head attention model. For example, to determine attention value for a word or other n-gram, some embodiments may combine Q vectors representing an initial embedding vector value of the n-gram with K vectors representing relationships between the word and other words of the n-gram sequence. The combined values may then be matrix multiplied with a sequence of embedding vectors representing the field descriptor to determine a final attention value for the word. Some embodiments may use a set of attention values corresponding with a sequence of words as inputs for a trained fully connected neural network or another type of neural network to determine an output score, where the output score may map to a set of categories. Some embodiments may then assign the set of categories to the field associated with the field descriptor based on the output score.

In some embodiments, the classification performed by a neural network may be binary. For example, some embodiments may use a neural network model to determine whether a field should or should not be assigned with a specific category based on an output score of the neural network model. For example, some embodiments may determine whether an output score of a neural network using attention values determined from a field descriptor of a field satisfies a score threshold. In response to a determination that the output score satisfies the score threshold, some embodiments may then assign a category associated with the score threshold to the field. Alternatively, some embodiments may use a neural network model to determine a plurality of categories for a field. For example, some embodiments may use a neural network model to determine that a field should be assigned with a first category "users" and a second category "overloaded."

As described elsewhere in this disclosure, some embodiments may use the domains associated with data tables, schemas, or databases to increase the accuracy or breadth of the classification of field descriptors provided by machine learning models. Some embodiments may determine the domains of a data table based on metadata associated with the data table, a schema of the data table, or a database storing the data table. For example, some embodiments may determine that a database is associated with the domain "123ck652" and, in response, retrieve a set of machine learning model parameters stored in a record that is mapped to the domain "123ck652." Some embodiments may then use the set of machine learning model parameters to assign a category to a field.

Some embodiments may retrieve an ontology graph that stores associations between different words, sub-words, phrases, or other N-grams. The ontology graph may include a set of ontology vertices and a set of ontology edges associating the ontology vertices, where a pair of ontology vertices may be adjacent to each other if the pair connected by an ontology edge. For example, the ontology graph may include a first graph vertex that is associated with a second graph vertex via a graph edge, where the first graph vertex may be associated with the string "t32hg4" and the second graph vertex may be associated with the string "f42joyk." After obtaining a field descriptor, some embodiments may then substitute one or more words, sub-words, phrases, or other N-grams of the ontology graph to generate a modified version of descriptors or other text inputs based on the ontology graph. For example, if a field descriptor included the text, "f342 t32hg4 fko02156," some embodiments may use an ontology graph to determine that "t32hg4" is associated with the string "f42joyk." Some embodiments may then perform one or more classification operations or other operations described in this disclosure using the text "f342 f42joyk fko02156" as a field descriptor.

Some embodiments may select different ontology graphs for a data table based on a set of domains associated with the data table. For example, some embodiments may select a first ontology graph for a first data table based on a determination that the first data table is associated with the domain "device health" and select a second ontology graph for a second data table based on a determination that the second data table is associated with the domain "internal testing and QA." By selecting different ontology graphs for different data tables, some embodiments may account for the use of different terminologies across different domains of a set of domains.

In some embodiments, the set of domains associated with a data table may be selected based on users indicated to have accessed the data table. For example, some embodiments may record a first set of user roles of users indicated to have accessed a first data table, where the first set of user roles indicate that a majority of users accessing the data table have the "QA" user role. In response, some embodiments may determine that the domain "internal testing and QA" is associated with the first data table, where the "QA" user role may map to the "internal testing and QA" domain. Furthermore, in some embodiments, the use of user roles in assigning domains may result in the creation of hybrid domains, where a hybrid domain may be associated with a plurality of ontology graphs. As described elsewhere in this disclosure, some embodiments may use a plurality of ontology graphs to generate different variations of a field descriptor. Some embodiments may then perform one or more classification operations or other operations described in this disclosure on the different variations of the field descriptor to increase the assignment accuracy.

As described elsewhere in this disclosure, some embodiments may segment a set of words into sub-words, where the sub-words may be included in an ontology graph. For example, some embodiments may obtain a field descriptor of a field that includes the phrase "useful for dist_controller." Some embodiments may segment the phrase into a sequence of sub-words and use an ontology graph associated with a domain of the data table to generate a set of other phrases based on the sequence sub-words. For example, some embodiments may obtain the phrase "useful for dist_controller" and determine the sequence of sub-words ["useful"; "for"; "dist"; "control"]. Some embodiments may then use an ontology graph that maps the sub-word "control" into the sub-word "own" to generate the sequence of sub-words ["useful"; "for"; "dist"; "own"]. Some embodiments may use the generated sequence of sub-words for a categorization operation or another type of operation, such as by providing a machine learning model with the sequence of sub-words to determine an output score used to categorize the field.

Once determined, these categories may indicate a set of value types that may be indexed by their categories to accelerate data retrieval or data update operations. For example, some embodiments may generate or update a record to associate a category with a set of fields to which the category is assigned. For example, after assigning the category "owner to a first field "OWNR1" and a second field "OWNR2," some embodiments may update a first data structure with values associating the "owner" with "OWNR1" and "OWNR2," where the data structure may include an index, list, a dictionary, a record, or another type of data structure. As described elsewhere in this disclosure, some embodiments may then refer to the first data to quickly identify fields of interest without searching through each of the fields.

Some embodiments may receive a message that includes a set of query parameters, as indicated by block 340. Some embodiments may receive the message via an API layer, where a client-side computer device may communicate with an on-site server or cloud-based service via the API layer. For example, a client-side computer device may send an HTTP web request that includes a user identifier, where the user identifier may then be used to retrieve a set of records or record values. In some embodiments, the message may receive a specified category type associated with the query parameter. For example, the message may provide a category type "user identifier" in association with the user identifier. Alternatively, or in addition, some embodiments may receive a message that includes a query parameter without an explicit category associated with the query parameter. For example, some embodiments may receive a message that includes the query parameter "XKY1235119N," where the message does not include an explicit category type to associate with the query parameter. In some embodiments, a category may be assigned to the query parameter by default. Alternatively, or in addition, some embodiments may determine a string pattern based on the query parameter to determine a category for the query parameter. Alternatively, or in addition, some embodiments may perform a set of machine learning operations to predict one or more categories based on the query parameter.

Some embodiments may obtain a query template or another set of query generation model parameters associated with the set of databases or set of schema, as indicated by block 350. In some embodiments, a query template may include a sequence of strings and indicators of one or more spaces in which a query parameter, database, or field identifier may be used. For example, some embodiments may use a query template "SELECT*WHERE {data_type}={data_value}" to obtain all values where "data_value" and "data_type" may be obtained from a message as a query parameter and a category indicating a field name. In some embodiments, a query template of the set of selected query templates may be selected with respect to a specific database or a query language compatible with the database. For example, after determining that a set of databases is to be searched by a query, some embodiments may retrieve three query templates, where each template of the three query templates is written in a query language compatible with at least one database of the set of databases.

Some embodiments may include operations that generates queries based on a query parameter. For example, after receiving the value "uid2015300," some embodiments determine that the query parameter satisfies a string pattern specifying a sequence of three alphabetical characters and seven numeric characters. Some embodiments may then obtain a query template associated with the string pattern and generate a plurality of queries based on the query template. Various other string patterns associated with different types of information may be used. For example, a string pattern associated with an email address may include a sequence of items that includes a first string, an "@" symbol, a second string, a period, and a third string.

As described elsewhere in this disclosure, some embodiments may retrieve records or record data from third-party data sources with a hidden or obfuscated schema. For example, some embodiments may retrieve a set of medical records from third-party server that requires and provides HL7-compliant messages. To account for this possibility, some embodiments retrieve a set of query templates specific to the third-party data source. As described elsewhere in this disclosure, some embodiments may communicate with third-party data sources capable of providing filtered data that provide requested record data without providing the entirety of a record. Alternatively, some embodiments may communicate with third-party data sources that provide the entirety of a set of records.

Some embodiments may retrieve a plurality of additional query parameters based on the message, as indicated by block 354. Some embodiments may access a data store that includes a set of data indicating that one or more query parameters of the message are part of a hierarchy of query parameters. For example, some embodiments may obtain a directed graph of nodes representing identifiers (e.g., by mapping to the identifiers) indicating that a first user is at an upper level in the hierarchy and that two other users are below the first user at a lower level in the hierarchy. Some embodiments may generate the directed graph from a data table of user identifiers by searching for a first user and adding the user as a root of a directed graph, where nodes of the directed graph may represent and be associated with other users that are indicated to be either directly or indirectly associated with the first user. For example, a data table may indicate that a first user "x001" has a second user "x002" and a third user "x003" that are subordinates of the first user. Additionally, the third user "x003" may have a fourth user "x004" identified as a subordinate. Some embodiments may generate a directed graph based on this information stored in the data table to select all of the users "x002," "x003," and "x004" for use in generating additional query parameters. Furthermore, some embodiments may determine that a node of the directed graph includes a plurality of connections to other nodes. For example, some embodiments may determine that more than a threshold number of other nodes are connected by graph edges to a first node and, in response, designate the first node as a well-connected node. In some embodiments, the well-connected node may represent an entity that is associated with a significant number of other entities. Some embodiments may tag query results of queries generated based on a query parameter associated with the well-connected entity, where the query parameter may include an identifier of the node, a user identifier associated with the node, a user role associated with the node, etc. As described elsewhere in this disclosure, some embodiments may then store the query results in association with the identifier of the node or another value associated with the node in a local storage, an in-memory data store, etc. in response to a determination that the node is a well-connected node.

Some embodiments may generate a set of structured queries based on the query template or another set of query generation model parameters, as indicated by block 360. Some embodiments may generate a plurality of structured queries by populating values of a query template with a corresponding query parameter from a received message. As described elsewhere in this disclosure, some embodiments may generate the plurality of structured queries for a selected set of databases or selected data tables of the set of databases. Some embodiments may select a database or data table based on an indication that the database or data table includes a field assigned to a category associated with a query parameter. For example, some embodiments may generate set of database queries based on a query parameter that includes a first subset of database queries written in the for an Azure™ SQL database and a second subset of database queries written the Cypher graph query language for a Neo4j™ graph database. The Azure SQL database may include three fields indicated by an index as being associated with a category and the Neo4j™ graph database may include one field indicated by the index as being associated with the category.

Some embodiments may generate a second set of query parameters different from a first set of query parameters based on the first set of query parameters. For example, in addition to obtaining a first set of query parameters, some embodiments may generate a second set of query parameters that includes the first set of query parameters and an additional query parameter. Alternatively, or in addition, the second set of query parameters may remove one or more query parameters of the first query parameters without including all parameters of the first query parameters. Some embodiments may then generate an additional set of structured queries based on the second set of query parameters. As described elsewhere in this disclosure, some embodiments may retrieve query results based on the additional set structured queries and store them in association with the second set of query parameters.

Some embodiments may use a machine learning model to generate a structured language query. For example, some embodiments may obtain a set of query generation model parameters for using a transformer neural network or a recurrent neural network to generate the first set of structured queries for a SQL server. As described elsewhere in this disclosure, some embodiments may perform a set of operations to standardize a search pattern into a standardized segment-able sub-queries. Some embodiments may then store results of a SQL search in association with the sub-queries, where the standardization of the query may reduce the risk of performing a duplicative query on a database.

Some embodiments may retrieve a plurality of query results based on the plurality of database queries, as indicated by block 364. Some embodiments may sequentially submit each query of the plurality of queries to a corresponding database for the query. Alternatively, or in addition, some embodiments may concurrently execute a plurality of database queries to retrieve data by using a set of databases. For example, some embodiments may initiate a multi-threading process on a database and concurrently execute a plurality of threads to parallelize a search through a database. Some embodiments may estimate a search time based on a query parameter or set of generated queries and determine a number of threads to execute based on the search time. Alternatively, or in addition, some embodiments may use a machine learning model to determine the number of threads to execute for a search.

Some embodiments may store the set of query results in electronic storage, as indicated by block 370. As described elsewhere in this disclosure, some embodiments may store records, record values, or other data obtained with a query in a local electronic storage of a client user device or a server. For example, after retrieving a set of three records based on a query parameter sent from a client computer device, some embodiments may send the set of three records to the client computer device in an HTTP web response. In some embodiments, the response may include or be associated with a set of instructions that causes the client computer device to store the three records in a local memory of the client computing device.

Some embodiments may change the structure of a set of query results when storing them to increase data retrieval speed or efficiency. For example, some embodiments may store data that is retrieved from a relational database management system (RDBMS) into a key-value system. In addition to generating a plurality of queries based on a set of query parameters, some embodiments may generate a hash key based on the set of query parameters using a cryptographic hashing algorithm, such as an SHA-2, SHA-3, BLAKE2, or BLAKE3. Some embodiments may then retrieve a set of records storing record identifiers, user identifiers, and natural language comments from a first database with the plurality of queries. Some embodiments may then store the records in a hash table as a set of hash values in association with the hash key, where the second database may be an in-memory data store capable of providing data faster than the first database. A later-received message may cause some embodiments to generate the same hash key, causing some embodiments to retrieve the set of record values by referencing the hash table with the hash key without sending a query to the first database. Furthermore, some embodiments may organize or otherwise associate each query with their corresponding category or a hashed version of the category value. For example, some embodiments may append a value representing a category to a hash key to associate the hash with the category. By associating the value with the category, some embodiments may more efficiently retrieve query results based on their corresponding category values.

As described elsewhere in this disclosure, some embodiments may generate a second set of query parameters different from a first set of query parameters based on the first set of query parameters. After generating a second set of query parameters, some embodiments may generate a second hash key based on the second set of query parameters. Furthermore, some embodiments may receive a second set of query results based on a second set of queries generated with the second set of query parameters. Some embodiments may then store the second set of query results as a second set of hash value of the hash table, where the second set of hash values may be mapped to the second hash key. As used in this disclosure, a set of values may be stored in a hash table if the values themselves are stored in the hash table or if an identifier (e.g., a pointer) to the set of values are stored in the hash table. Some embodiments may receive the second set of query parameters in a second web message and retrieve the subsets of the record values stored in the hash table instead of sending a plurality of queries based on the second set of query parameters to a plurality of databases. Furthermore, some embodiments may store a set of query results in an in-memory data store or a client device local storage based on a determination that the query results are provided in response to a query parameter associated with a well-connected node of a directed graph, where the directed graph may represent a set of hierarchical relationships.

Some embodiments may determine whether a set of records was retrieved more than a threshold number of times, where the threshold number may greater than two, greater than five, greater than 10, greater than 100, or some other number. For example, some embodiments may receive a first, second, and third query having the same user identifier as a query parameter over the course three different messages. Some embodiments may retrieve the same set of records from each of the three queries, where a threshold number of times may be equal to two. Some embodiments may then determine that the set of records was retrieved more than a threshold number of times. In response, some embodiments may store the set of records in association with the query parameter in an in-memory data store. As described elsewhere in this disclosure, storing values in an in-memory data store may accelerate the retrieval of those values. Some embodiments may receive an additional message and generate another query based on the additional message that includes a previously used value.

As described elsewhere in this disclosure, some embodiments may store query results on local memory to accelerate data retrieval. Some embodiments may determine that a set of retrieved records or record values may be stored based on the source of the retrieved data. For example, some embodiments may determine that a set of retrieved records are obtained from a third-party data source, where use of the third-party data source may incur additional computational costs, network performance costs, or other types of costs. In response, some embodiments may store the record data in a local electronic storage for data retrieval. After storing the record data, an additional request for data from the third-party data may cause some a query system to retrieve data from the locally stored version.

Some embodiments may present a visualization of the query results, as indicated by block 374. For example, some embodiments may cause the display of a first set of shapes representing a retrieved set of records, where the first set of shapes may include a two-dimensional shape such as an ovaloid shape, a polygons, a combination of different shapes, etc. Alternatively, or in addition, some embodiments may render a set of three-dimensional shapes that represent the retrieved set of records. For example, some embodiments may cause the display of a set of circles on a screen, where each circle may represent a retrieved record and may present a set of attribute values of the record. Some embodiments may augment the display by displaying other records from the same data table of the retrieved records or a different data table. For example, generate a second set of shapes representing a set of identified users, where each identified user is identified by an attribute of the retrieved set of records. Some embodiments may indicate a set of relationships between the set of identified users and the retrieved set of records using a third set of shapes. For example, some embodiments may display a set of lines, where each line may show a connection between a shape of the first set of shapes and a shape of the second set of shapes. As used in this disclosure, a shape may include a line, a two-dimensional shape (e.g., a circle, a polygon, an amorphous shape, etc.), or a three-dimensional shape (e.g., a sphere, cone, cylinder, a polyhedron, etc.). Furthermore, in cases where the shapes represent user records, some embodiments may display a set of user names over the shapes.

In some embodiments, the visualization may indicate whether or not an obtained record is in another set of records, where the other set of records may be stored in another data table, another database, or another collection of records. Some embodiments may determine whether a set of records stored in a first data table includes a record retrieved from a second data table by determining whether the data table has an identifier equal to an identifier of the record or is otherwise unique to the retrieved record. For example, some embodiments may determine whether an identifier of a user is stored in a data table of employees. Some embodiments may then determine whether the user indicated by an attribute of the data table as an active employee. In response to a determination that the attribute of the data table indicates that the user is not an active employee, some embodiments may determine that a set of records representing the user records of active employees does not include the first record. Furthermore, in response to a determination that the set of user records representing active employees does not include the first record, some embodiments may visually display the identifier. For example, some embodiments may display a set of shapes to represent each record of a set of retrieved records from a first database. In response to a determination that a first record of the set of retrieved records is not included in a second set of records, some embodiments may display a first shape representing the first record different from the shapes representing the second set of records. For example, some embodiments may display the first shape with a different color, change the geometry of the first shape, change the size of the first shape, or the like.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of the system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computers and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-126 described herein is for illustrative purposes, and is not intended to be limiting, as any of subsystems 124-125 may provide more or less functionality than is described. For example, one or more of subsystems 124-126 may be eliminated, and some or all of its functionality may be provided by other ones of subsystems 124-126. As another example, additional subsystems may be programmed to perform some or all of the functionality attributed herein to one of subsystems 124-126.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

ENUMERATED EMBODIMENTS

The present techniques will be better understood with reference to the following enumerated embodiments:

1. A method comprising: obtaining a schema of a database; obtaining a field of a data table of the schema; accessing a first set of records structured in accordance with the schema; assigning a category to the field using a machine learning model; subsequent to the assignment of the category to the field, receiving an identifier; obtaining a set of query generation model parameters associated with the database or the schema; generating a plurality of structured queries based on the set of query generation model parameters, the identifier, and the category; retrieving a second set of records from the database based on the plurality of structured queries; and storing the second set of records in association with the identifier and the category.

2. The method of embodiment 1, the field comprising a field name and a field descriptor, wherein assigning the category to the field comprises assigning the category based on the field name of the field and the field descriptor of the field.

3. The method of any of embodiments 1 to 2, wherein obtaining the schema comprises accessing the database to obtain the schema, and wherein attributes of the first set of records of the field conform to a string pattern associated with the category, and wherein the identifier satisfies the string pattern, and wherein and the plurality of structured queries is a plurality of database queries.

4. The method of any of embodiments 1 to 3, wherein the field descriptor comprises natural language text, and wherein the category indicates a value type, and wherein receiving the identifier comprises determining that the identifier is associated with the category, and wherein the set of query generation model parameters comprises a query template, and wherein the plurality of database queries comprises a query indicating the data table and the field, and wherein the method further comprising determining a key based on the identifier and the category, and wherein storing the second set of records comprises storing the second set of records in an in-memory data store, and wherein the second set of records is stored in association with the key.

5. The method of any of embodiments 1 to 4, wherein the identifier is a first identifier, the method further comprising retrieving a directed graph of identifiers that indicates that a plurality of identifiers are directed to the first identifier, wherein: generating the plurality of database queries comprises generating the plurality of database queries based on the plurality of identifiers; the plurality of identifiers comprises a second identifier; retrieving the second set of records comprises retrieving a subset of records of the second set of records based on the second identifier; and storing the second set of records comprises: determining whether a number of edges connecting a node of the directed graph with other nodes of the directed satisfies a threshold, wherein the node is mapped to the second identifier; and in response to a determination that the number of edges connecting the node of the directed graph with other nodes of the directed satisfies the threshold storing the subset of records in an in-memory data store in association with the second identifier.

6. The method of any of embodiments 1 to 5, wherein the category is a first category, the method further comprising: determining a score and an initial category based on the field name and the field descriptor using a first neural network, wherein the initial category is different from the first category; in response to a determination that the score does not satisfy a score threshold, determining the first category based on the field descriptor using a second neural network, wherein the second neural network determines a set of attention values for n-grams of the field descriptor; and re-training the first neural network to update a set of machine learning model parameters of the first neural network based on the first category, wherein an output of the first neural network is the first category based on the field name and the field descriptor after the re-training.

7. The method of any of embodiments 1 to 6, wherein: the category is a first category; assigning the category comprises: using a rules engine to predict an initial category based on a first conditional statement of the rules engine, wherein the initial category is different from the first category; determining the first category based on the field descriptor using a neural network; and the method further comprise: determining a word of the field name or the field descriptor; and updating the rules engine to comprise a second conditional statement, wherein a condition of the second conditional statement comprises the word, wherein a priority of the second conditional statement is greater than a priority of the first conditional statement.

8. The method of any of embodiments 1 to 7, wherein the database is a first database, wherein the identifier is received via a first web request, the method further comprising: determining whether the second set of records was retrieved more than a threshold number of times; in response to a determination that the second set of records was retrieved more than the threshold number of times, caching the second set of records in an in-memory data store; subsequent to receiving the first web request, receiving a second web request, wherein the second web request comprises the identifier; and retrieving the second set of records from the in-memory data store without retrieving the second set of records from the first database.

9. The method of any of embodiments 1 to 8, wherein assigning the category comprises: determining a set of domains based on user roles of users indicated to have accessed the data table; accessing an ontology graph based on the set of domains; segmenting the field descriptor into a sequence of sub-words by matching sub-words of the field descriptor to vertices of the ontology graph and mapping other sub-words of the ontology graph indicated as adjacent to the sub-words of the field descriptor by edges of the ontology graph; generating a modified version of the field descriptor based on the sequence of sub-words and the ontology graph; and assigning the category to the field based on the modified version of the field descriptor.

10. The method of any of embodiments 1 to 9, the method further comprising: accessing a third set of records, wherein each respective record of the third set of records comprises a respective attribute for a first field, wherein the respective attribute satisfies the string pattern; determining whether the identifier is stored as an attribute of the first field; and in response to a determination that the identifier is not stored as an attribute of the first field of the third set of records, causing a display to visually indicate the identifier.

11. The method of any of embodiments 1 to 10, wherein assigning the category comprises: determining a first score based on the field name; in response to a determination that the first score does not satisfy a first score threshold, determining a second score based on the field descriptor by: retrieving a set of query generation model parameters based on a domain associated with the field; determining the second score using a neural network based on the set of query generation model parameters; and in response to a determination that the second score satisfies a second score threshold, assigning the category indicating to the field.

12. The method of any of embodiments 1 to 11, wherein generating the plurality of database queries comprises generating the plurality of database queries using a neural network, wherein the parameters of the neural network comprise the set of query generation model parameters.

13. The method of any of embodiments 1 to 12, wherein: the schema is a first schema; the field is a first field; the database is a first database; the set of query generation model parameters comprises a first query template; accessing the set of databases to obtain a second schema of a second database, the second schema comprising a second field; assigning the category comprises assigning the category to a second field of the second schema based on a second field name of the second field, wherein attributes of the second field conform to the string pattern; wherein generating the plurality of database queries comprises generating a subset of queries of the plurality of database queries based on a second query template and the second field; the method further comprising retrieving a set of records from the second database based on the subset of queries.

14. The method of any of embodiments 1 to 13, further comprising: determining that a first generated query of the plurality of database queries and a second generated query of the plurality of database queries are the same; and in response to determining that the first and second generated queries are the same, updating the plurality of database queries by de-duplicating the first generated query and second generated query.

15. The method of any of embodiments 1 to 14, further comprising: causing the display of a first set of shapes based on the second set of records; causing the display of a second set of shapes based on a set of identified users; and causing the display of a set of shapes connecting the first set of shapes with the second set of shapes.

16. The method of any of embodiments 1 to 15, wherein the identifier is a first identifier, the method further comprising retrieving a directed graph of identifiers that indicates that a plurality of identifiers is directed to the first identifier, wherein generating the plurality of database queries comprises generating the plurality of database queries based on the plurality of identifiers.

17. The method of any of embodiments 1 to 16, wherein: the plurality of identifiers comprises a second identifier; retrieving the second set of records comprises retrieving a subset of records of the second set of records based on the second identifier; and storing the second set of records comprises storing the subset of records in an in-memory data store in association with the second identifier.

18. The method of any of embodiments 1 to 17, wherein storing the subset of records in the in-memory data store comprises: determining whether a count of the times that the second identifier was used to retrieve records is greater than a threshold; in response to a determination that the count of the times that the second identifier was used to retrieve records is greater than the threshold, storing the subset of records in the in-memory data store.

19. The method of any of embodiments 1 to 18, wherein retrieving the second set of records comprises executing a plurality of threads when querying the database with the plurality of structured queries.

20. The method of any of embodiments 1 to 19, wherein the schema is a first schema, the method further comprising: detecting an addition of a second schema to the first database; and obtaining fields of the second schema, each respective field of the fields of the second schema comprising a field name of the respective field and a field descriptor of the respective field; accessing a plurality of records structured in accordance with the second schema; assigning the category to a second field based on the field name and the field descriptor using a machine learning model, wherein the second field is a field of the second schema; and storing an identifier of the second field in a record associating the second field with the first field and the second field.

21. The method of any of embodiments 1 to 20, wherein: receiving the identifier comprises receiving a web message comprising the category; and obtaining the set of query generation model parameters comprises selecting the set of query generation model parameters based on the category.

22. One or more tangible, non-transitory, machine-readable media storing instructions that, when executed by one or more processors, effectuation operations comprising those of any of embodiments 1-21.

23. A system comprising: one or more processors; and memory storing computer program instructions that, when executed by the one or more processors, cause the one or more processors to effectuate operations comprising those of any of embodiments 1-21.

What is claimed is:

1. A system for record retrieval comprising a computer system that comprises one or more processors programmed with computer program instructions that, when executed, cause the computer system to perform operations comprising:
   accessing a database to obtain a schema;
   obtaining a field of a data table of the schema, the field comprising a field name and a field descriptor, wherein the field descriptor comprises natural language text;
   accessing a first set of records structured in accordance with the schema;
   assigning a category indicating a value type to the field of the schema based on the field name and the field descriptor using a machine learning model, wherein attributes of the first set of records of the field conform to a string pattern associated with the category;
   subsequent to the assignment of the category to the field, receiving a first identifier and determining that the first identifier satisfying the string pattern is associated with the category;
   retrieving a directed graph of identifiers that indicates that a plurality of identifiers are directed to the first identifier, the plurality of identifiers comprising a second identifier;
   obtaining a query template associated with the database or the schema;
   generating a plurality of database queries based on the query template, the first identifier, the plurality of identifiers, and the category, wherein the plurality of database queries comprises a query indicating the data table and the field;

retrieving a second set of records from the database based on the plurality of database queries, wherein retrieving the second set of records comprises retrieving a subset of records based on the second identifier;

determining a key based on the first identifier and the category; and storing the second set of records in an in-memory data store, wherein the second set of records is stored in association with the key, and wherein storing the second set of records comprises:

determining whether a number of edges connecting a node of the directed graph with other nodes of the directed graph satisfies a threshold, wherein the node is mapped to the second identifier; and in response to a determination that the number of edges connecting the node of the directed graph with other nodes of the directed graph satisfies the threshold, storing the subset of records in the in-memory data store in association with the second identifier.

2. The system of claim 1, wherein the category is a first category, the operations further comprising:

determining a score and an initial category based on the field name and the field descriptor using a first neural network, wherein the initial category is different from the first category;

in response to a determination that the score does not satisfy a score threshold, determining the first category based on the field descriptor using a second neural network, wherein the second neural network determines a set of attention values for n-grams of the field descriptor; and re-training the first neural network to update a set of machine learning model parameters of the first neural network based on the first category, wherein an output of the first neural network is the first category based on the field name and the field descriptor after the re-training.

3. The system of claim 1, wherein:

the category is a first category;

assigning the category comprises:

using a rules engine to predict an initial category based on a first conditional statement of the rules engine, wherein the initial category is different from the first category;

determining the first category based on the field descriptor using a neural network; and the operations further comprise:

determining a word of the field name or the field descriptor; and updating the rules engine to comprise a second conditional statement, wherein a condition of the second conditional statement comprises the word, wherein a priority of the second conditional statement is greater than a priority of the first conditional statement.

4. The system of claim 1, wherein the database is a first database, wherein the first identifier is received via a first web request, the operations further comprising:

determining whether the second set of records was retrieved more than a threshold number of times;

in response to a determination that the second set of records was retrieved more than the threshold number of times, caching the second set of records in the in-memory data store;

subsequent to receiving the first web request, receiving a second web request, wherein the second web request comprises the first identifier; and retrieving the second set of records from the in-memory data store without retrieving the second set of records from the first database.

5. The system of claim 1, the operations further comprising:

accessing a third set of records, wherein each respective record of the third set of records comprises a respective attribute for a first field, wherein the respective attribute satisfies the string pattern;

determining whether the first identifier is stored as an attribute of the first field; and in response to a determination that the first identifier is not stored as an attribute of the first field of the third set of records, causing a display to visually indicate the first identifier.

6. A method comprising:

accessing a database to obtain a schema;

obtaining a field of a data table of the schema, the field comprising a field name and a field descriptor;

accessing a first set of records structured in accordance with the schema;

assigning a category to the field based on the field name of the field and the field descriptor of the field using a machine learning model, wherein attributes of the first set of records of the field conform to a string pattern associated with the category;

subsequent to the assignment of the category to the field, receiving a first identifier that satisfies the string pattern;

retrieving a directed graph of identifiers that indicates that a plurality of identifiers are directed to the first identifier, the plurality of identifiers comprising a second identifier;

obtaining a set of query generation model parameters associated with the database or the schema;

generating a plurality of database queries based on the set of query generation model parameters, the first identifier, the plurality of identifiers, and the category;

retrieving a second set of records from the database based on the plurality of database queries, wherein retrieving the second set of records comprises retrieving a subset of records based on the second identifier; and storing the second set of records in association with the first identifier and the category, and wherein storing the second set of records comprises:

determining whether a number of edges connecting a node of the directed graph with other nodes of the directed graph satisfies a threshold, wherein the node is mapped to the second identifier; and in response to a determination that the number of edges connecting the node of the directed graph with other nodes of the directed graph satisfies the threshold, storing the subset of records in association with the second identifier.

7. The method of claim 6, wherein assigning the category comprises:

determining a first score based on the field name;

in response to a determination that the first score does not satisfy a first score threshold, determining a second score based on the field descriptor by:

retrieving a set of query generation model parameters based on a domain associated with the field;

determining the second score using a neural network based on the set of query generation model parameters; and in response to a determination that the second score satisfies a second score threshold, assigning the category indicating to the field.

8. The method of claim 6, wherein generating the plurality of database queries comprises generating the plurality of database queries using a neural network, wherein parameters of the neural network comprise the set of query generation model parameters.

9. The method of claim 6, wherein:
the schema is a first schema;
the field is a first field;
the database is a first database;
the set of query generation model parameters comprises a first query template;
accessing a set of databases to obtain a second schema of a second database, the second schema comprising a second field;
assigning the category comprises assigning the category to a second field of the second schema based on a second field name of the second field, wherein attributes of the second field conform to the string pattern;
wherein generating the plurality of database queries comprises generating a subset of queries of the plurality of database queries based on a second query template and the second field;
the method further comprising retrieving a set of records from the second database based on the subset of queries.

10. The method of claim 6, further comprising:
determining that a first generated query of the plurality of database queries and a second generated query of the plurality of database queries are the same; and
in response to determining that the first and second generated queries are the same, updating the plurality of database queries by de-duplicating the first generated query and second generated query.

11. The method of claim 6, further comprising:
causing the display of a first set of shapes based on the second set of records;
causing the display of a second set of shapes based on a set of identified users; and
causing the display of a set of shapes connecting the first set of shapes with the second set of shapes.

12. The method of claim 6, wherein
storing the second set of records comprises storing the subset of records in an in-memory data store in association with the second identifier.

13. The method of claim 12, wherein storing the subset of records in the in-memory data store comprises:
determining whether a count of the times that the second identifier was used to retrieve records is greater than a threshold; and
in response to a determination that the count of the times that the second identifier was used to retrieve records is greater than the threshold, storing the subset of records in the in-memory data store.

14. One or more non-transitory machine-readable media storing program code that, when executed by a computer system, causes the computer system to perform operations comprising:
obtaining a schema of a database;
obtaining a field of a data table of the schema, the field comprising a field name and a field descriptor;
accessing a first set of records structured in accordance with the schema;
assigning a category to the field based on the field name of the field and the field descriptor of the field using a machine learning model, and wherein assigning the category comprises:
accessing an ontology graph comprising vertices and edges based on a set of domains associated with user roles of users indicated to have accessed the data table;
segmenting the field descriptor into a sequence of sub-words by matching first sub-words of the field descriptor to the vertices and mapping second sub-words of the ontology graph indicated as adjacent to the first sub-words by the edges;
generating a modified field descriptor based on the sequence of sub-words; and
assigning the category to the field based on the modified field descriptor;
subsequent to the assignment of the category to the field, receiving an identifier;
obtaining a set of query generation model parameters associated with the database or the schema;
generating a plurality of structured queries based on the set of query generation model parameters, the identifier, and the category;
retrieving a second set of records from the database based on the plurality of structured queries; and
storing the second set of records in association with the identifier and the category.

15. The one or more non-transitory machine-readable media of claim 14, wherein retrieving the second set of records comprises executing a plurality of threads when querying the database with the plurality of structured queries.

16. The one or more non-transitory machine-readable media of claim 14, wherein the schema is a first schema, and wherein the field is a first field, the operations further comprising:
detecting an addition of a second schema to the first-database;
obtaining fields of the second schema, each respective field of the fields of the second schema comprising a field name of the respective field and a field descriptor of the respective field;
accessing a plurality of records structured in accordance with the second schema;
assigning the category to a second field based on the field name and the field descriptor using the machine learning model, wherein the second field is a field of the second schema; and
storing an identifier of the second field in a record associating the second field with the first field.

17. The one or more non-transitory machine-readable media of claim 14, wherein:
receiving the identifier comprises receiving a web message comprising the category; and
obtaining the set of query generation model parameters comprises selecting the set of query generation model parameters based on the category.

18. The one or more non-transitory machine-readable media of claim 14, wherein generating the plurality of structured queries comprises generating the plurality of structured queries using a neural network, wherein parameters of the neural network comprise the set of query generation model parameters.

19. The one or more non-transitory machine-readable media of claim 14, further comprising:
- determining that a first generated query of the plurality of structured queries and a second generated query of the plurality of structured queries are identical; and
- in response to determining that the first and second generated queries are identical, updating the plurality of structured queries by de-duplicating the first generated query and second generated query.

20. The one or more non-transitory machine-readable media of claim 14, further comprising:
- causing the display of a first set of shapes based on the second set of records;
- causing the display of a second set of shapes based on a set of identified users; and
- causing the display of a set of shapes connecting the first set of shapes with the second set of shapes.

\* \* \* \* \*